(12) United States Patent
Uhrich et al.

(10) Patent No.: US 8,776,496 B2
(45) Date of Patent: *Jul. 15, 2014

(54) HYDROCARBON RETAINING SYSTEM CONFIGURATION FOR COMBUSTION ENGINE

(75) Inventors: Michael James Uhrich, West Bloomfield, MI (US); Shane Elwart, Ypsilanti, MI (US); James Michael Kerns, Trenton, MI (US); Jason Aaron Lupescu, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/396,394

(22) Filed: Feb. 14, 2012

(65) Prior Publication Data

US 2012/0137659 A1    Jun. 7, 2012

Related U.S. Application Data

(63) Continuation of application No. 12/147,281, filed on Jun. 26, 2008, now Pat. No. 8,112,985.

(60) Provisional application No. 60/987,350, filed on Nov. 12, 2007.

(51) Int. Cl.
*F01N 3/00*    (2006.01)

(52) U.S. Cl.
USPC .............. 60/284; 60/286; 60/287; 60/320

(58) Field of Classification Search
USPC ............ 60/281, 284, 286, 287, 299, 320
See application file for complete search history.

(56) References Cited

U.S. PATENT DOCUMENTS

| | | | | |
|---|---|---|---|---|
| 3,645,098 A | * | 2/1972 | Templin et al. | 60/288 |
| 3,699,683 A | | 10/1972 | Tourtellotte et al. | |
| 3,757,521 A | | 9/1973 | Tourtellotte et al. | |
| 4,131,097 A | | 12/1978 | Sawada et al. | |
| 4,945,885 A | * | 8/1990 | Gonze et al. | 123/520 |
| 4,955,345 A | * | 9/1990 | Brown et al. | 123/381 |
| 5,021,071 A | | 6/1991 | Reddy | |
| 5,106,588 A | * | 4/1992 | Sims et al. | 422/180 |

(Continued)

FOREIGN PATENT DOCUMENTS

| | | |
|---|---|---|
| EP | 0957243 A2 | 11/1999 |
| GB | 2254014 A | 3/1991 |

(Continued)

OTHER PUBLICATIONS

Machine Translation of JP-2007-309196, Machine Translated on Jul. 23, 2013.*

(Continued)

*Primary Examiner* — Thomas Denion
*Assistant Examiner* — Patrick Maines
(74) *Attorney, Agent, or Firm* — Julia Voutyras; Alleman Hall McCoy Russell & Tuttle LLP

(57) ABSTRACT

Systems, methods, and computer readable storage media are described in which exhaust gas is routed to a hydrocarbon retaining device during starting, and purged to the engine intake manifold. Various alternative approaches are described for controlling operation and diagnosing degradation. Further, various interrelated configurations are described.

9 Claims, 12 Drawing Sheets

(56) References Cited

U.S. PATENT DOCUMENTS

| | | | |
|---|---|---|---|
| 5,125,231 A | 6/1992 | Patil et al. | |
| 5,140,811 A * | 8/1992 | Minami et al. | 60/297 |
| 5,190,014 A * | 3/1993 | Suga et al. | 123/519 |
| 5,207,734 A * | 5/1993 | Day et al. | 60/278 |
| 5,231,969 A * | 8/1993 | Suga | 123/685 |
| 5,239,824 A | 8/1993 | Matsumoto | |
| 5,272,873 A | 12/1993 | Hamazaki | |
| 5,273,020 A | 12/1993 | Hayami | |
| 5,307,627 A * | 5/1994 | Christensen et al. | 60/274 |
| 5,331,809 A | 7/1994 | Takeshima et al. | |
| 5,375,414 A * | 12/1994 | Adamczyk et al. | 60/274 |
| 5,388,558 A | 2/1995 | Plapp et al. | |
| 5,524,433 A * | 6/1996 | Adamczyk et al. | 60/276 |
| 5,589,143 A * | 12/1996 | Mori et al. | 422/171 |
| 5,603,215 A * | 2/1997 | Sung et al. | 60/274 |
| 5,619,973 A | 4/1997 | Hara et al. | |
| 5,658,372 A | 8/1997 | Gadkaree | |
| 5,744,103 A | 4/1998 | Yamada et al. | |
| 5,806,304 A | 9/1998 | Price et al. | |
| 5,916,133 A | 6/1999 | Buhrmaster et al. | |
| 5,941,068 A | 8/1999 | Brown et al. | |
| 5,946,906 A | 9/1999 | Akazaki et al. | |
| 5,956,947 A | 9/1999 | Tanaka et al. | |
| 6,003,309 A | 12/1999 | Agustin et al. | |
| 6,098,601 A * | 8/2000 | Reddy | 123/520 |
| 6,102,003 A | 8/2000 | Hyodo et al. | |
| 6,122,908 A * | 9/2000 | Wirmark | 60/274 |
| 6,164,063 A | 12/2000 | Mendler | |
| 6,247,457 B1 | 6/2001 | Mallebrein | |
| 6,253,547 B1 | 7/2001 | Watanabe et al. | |
| 6,334,431 B1 | 1/2002 | Kanchiro et al. | |
| 6,463,907 B1 | 10/2002 | Hiltner | |
| 6,560,959 B2 | 5/2003 | Katsuta et al. | |
| 6,606,855 B1 | 8/2003 | Kong et al. | |
| 6,625,978 B1 | 9/2003 | Eriksson et al. | |
| 6,813,883 B1 | 11/2004 | Lewis | |
| 6,820,416 B2 | 11/2004 | Ueno et al. | |
| 6,823,664 B2 | 11/2004 | Nakatani et al. | |
| 6,901,743 B2 | 6/2005 | Asanuma et al. | |
| 6,971,375 B2 | 12/2005 | Amano et al. | |
| 7,007,459 B2 | 3/2006 | Lee | |
| 7,331,334 B2 * | 2/2008 | Leone et al. | 123/516 |
| 7,913,672 B2 | 3/2011 | Elwart et al. | |
| 2003/0106306 A1 | 6/2003 | Nakatani et al. | |
| 2003/0213232 A1 | 11/2003 | Brisley et al. | |
| 2004/0076566 A1 | 4/2004 | Unger et al. | |
| 2005/0155587 A1 | 7/2005 | Suzuki | |
| 2005/0166577 A1 | 8/2005 | Chandler et al. | |
| 2005/0205472 A1 | 9/2005 | Boertje et al. | |
| 2006/0053771 A1 | 3/2006 | Murata et al. | |
| 2006/0065253 A1 * | 3/2006 | Reddy | 123/520 |
| 2006/0254266 A1 | 11/2006 | Chandler et al. | |
| 2008/0110441 A1 | 5/2008 | Leone et al. | |
| 2009/0120061 A1 * | 5/2009 | Elwart et al. | 60/274 |
| 2009/0120063 A1 * | 5/2009 | Uhrich et al. | 60/278 |
| 2009/0120064 A1 | 5/2009 | Uhrich et al. | |
| 2009/0120065 A1 * | 5/2009 | Uhrich et al. | 60/284 |
| 2009/0120067 A1 * | 5/2009 | Elwart et al. | 60/285 |
| 2009/0120071 A1 * | 5/2009 | Gandhi et al. | 60/287 |
| 2010/0024396 A1 * | 2/2010 | Lupescu et al. | 60/284 |

FOREIGN PATENT DOCUMENTS

| | | | | |
|---|---|---|---|---|
| JP | 63176650 A | | 7/1988 | |
| JP | 5099083 A | | 4/1993 | |
| JP | 05099083 A | * | 4/1993 | F02M 25/08 |
| JP | 09088738 A | * | 3/1997 | F02M 25/08 |
| JP | 10121949 | | 5/1998 | |
| JP | 10193991 A | | 7/1998 | |
| JP | 10252449 | | 9/1998 | |
| JP | 2002188434 | | 7/2002 | |
| JP | 2006342700 A | * | 12/2006 | |
| JP | 2007309196 A | * | 11/2007 | |
| WO | 9629141 A1 | | 9/1996 | |

OTHER PUBLICATIONS

Partial Translation of Office Action of Chinese Application No. 200910148941.9, Issued Jul. 10, 2012, State Intellectual Property Office of PRC, 9 Pages.

Partial Translation of Office Action of Chinese Application No. 200910148940.4, Issued Jun. 6, 2012, State Intellectual Property Office of PRC, 2 Pages.

Partial Translation of Office Action of Chinese Application No. 200910148938.1, Issued Jun. 20, 2012, State Intellectual Property Office of PRC, 2 Pages.

Partial Translation of Office Action of Chinese Application No. 200910148939.1, Issued Jan. 29, 2013, State Intellectual Property Office of PRC, 8 Pages.

Elwart, Shane et al., "Exhaust System for Combustion Engine," U.S. Appl. No. 60/987,350, filed Nov. 12, 2007, 66 pages.

Yamazaki, Hideharu et al., "Research on HC Adsorption Emission System," SAE Technical Paper Series No. 2004-01-1273, SAE World Congress, Detroit, Michigan, Mar. 8-11, 2004, 11 pages.

* cited by examiner

HYDROCARBON RETAINING SYSTEM CONFIGURATION FOR COMBUSTION ENGINE

CROSS REFERENCE TO RELATED APPLICATIONS

The present application is a continuation of U.S. patent application Ser. No. 12/147,281 filed Jun. 26, 2008, now U.S. Pat. No. 8,112,985, which claims priority to provisional application 60/987,350, filed Nov. 12, 2007, the entire contents of which are incorporated herein by reference for all purposes.

FIELD

The present description relates generally to an exhaust treatment system for a combustion engine.

BACKGROUND/SUMMARY

Engine exhaust systems have utilized hydrocarbon retaining devices, such as hydrocarbon traps, to retain cold start emissions for later reaction, or to recirculate into the engine intake system. In one particular example, the purging of exhaust gases may be enabled when the device reaches a predetermined temperature.

However, the inventors herein have recognized several issues with such examples. For example, desorption of the stored hydrocarbons may occur over a significantly long duration under some conditions. As such, if the engine is stopped before the stored hydrocarbons are sufficiently purged, subsequent cold start emissions may increase. Further, extended purging operation may limit other operations, such as adaptive fuel learning, etc.

In one approach, the above issues may be addressed by a system for managing emissions of an engine of a vehicle, the system comprising: a first exhaust passage including an emission control device, the first passage including a downstream section, the downstream section downstream of the emission control device and including a tailpipe of the vehicle; and a second exhaust passage coupled to the first exhaust passage downstream of the emission control device, the second exhaust passage including a hydrocarbon retaining system, the hydrocarbon retaining system including a vent passage, where at least a portion of the vent passage is positioned adjacent and thermally coupled to at least a portion of the downstream section of the first exhaust passage.

In this way, it is possible to utilize waste exhaust heat to improve purging of the hydrocarbon retaining system to the engine intake. This can be especially advantageous in that when the exhaust gas is warm enough to provide sufficient heat to the vent passage, an emission control device it also sufficiently warm enough so that purging operation can be carried out.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
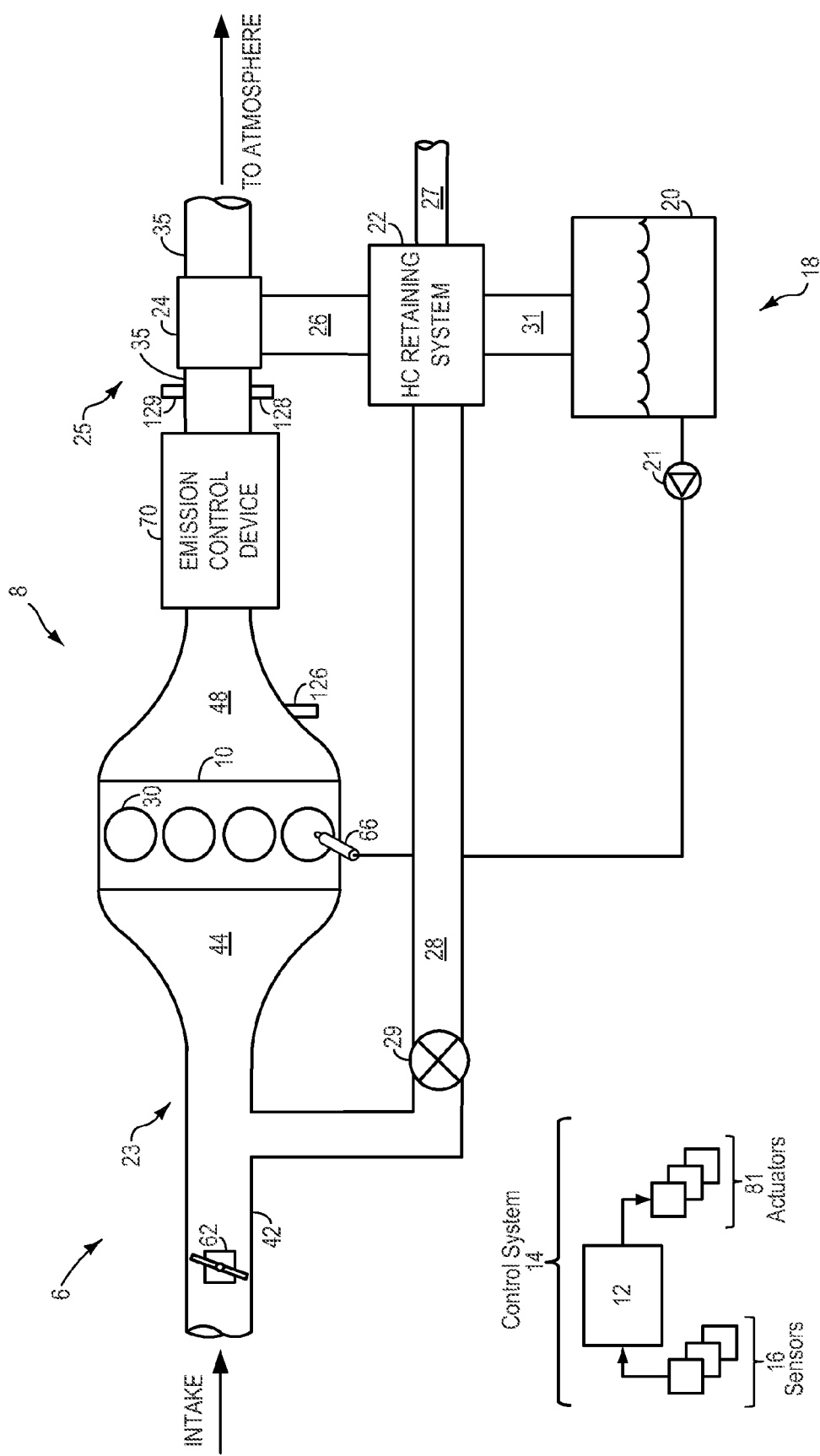
FIG. 1 shows a schematic depiction of an engine, exhaust system, and a hydrocarbon (HC) retaining system.

FIG. 1 shows a schematic depiction of a vehicle system 6. The vehicle system 6 includes an engine system 8 coupled to a hydrocarbon (HC) retaining system 22 and a fuel system 18.

The engine system 8 may include an engine 10 having a plurality of cylinders 30. The engine 10 includes an intake 23 and an exhaust 25. The intake 23 includes a throttle 62 fluidly coupled to the engine intake manifold 44 via an intake passage 42. The exhaust 25 includes an exhaust manifold 48 leading to an exhaust passage 35 that routes exhaust gas to the atmosphere. The exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It can be appreciated that other components may be included in the engine such as a variety of valves and sensors, shown in the example engine of FIG. 2.

The exhaust 25 may also be operatively coupled to hydrocarbon retaining system 22 via conduit 26 and valve 24. In one example, exhaust gases may be routed to the hydrocarbon retaining system 22 during engine cold start operation. Then, once the emission control device 70 has reached its operating temperature, the hydrocarbons retained in system 22 may be purged to the engine via intake 23, as described below herein.

Returning to FIG. 1, fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It can be appreciated that fuel system 18 may be a returnless fuel system, a return fuel system, or various other types of fuel system. Vapors generated in the fuel system 18 may be routed to hydrocarbon retaining system 22, described further below, via conduit 31, before being purged to the engine intake 23.

The fuel tank 20 may hold a plurality of fuel blends, including fuel with a range of alcohol concentrations, such as various gasoline-ethanol blends, including E10, E85, gasoline, etc., and combinations thereof.

Hydrocarbon retaining system 22 may include one or more hydrocarbon retaining devices, such as a hydrocarbon trap configured to temporarily trap hydrocarbons from entering gases. Hydrocarbon retaining system 22 may further include a vent 27 which may route gases out of the retaining system 22 to atmosphere when storing, or trapping, hydrocarbons from the exhaust 25 and/or fuel system 18. Vent 27 may also allow fresh air to be drawn into hydrocarbon retaining system 22 when purging stored hydrocarbons from the exhaust 25 and/or fuel system 18 to the intake 23 via purge conduit 28 and purge valve 29. While this example shows vent 27 communicated with fresh, unheated air, various modifications may also be used. For example, heated intake air from an air cleaner box may be used. Further, heated exhaust gas may be used under selected conditions.

Various system configurations of hydrocarbon retaining system 22 in system 6 may be used, with various combinations of valves, sensors, and the like. For example, various system configurations are described herein with regard to FIGS. 3-7, discussed below. And while the various configurations of FIGS. 3-7 show various alternative features in particular combinations, the various features from among FIGS. 3-7 may also be combined together to form still further example configurations. Further various additional components may be included in the intake, exhaust, and fuel system, such as a muffler downstream of valve 24.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as pressure, temperature, and composition sensors may be coupled to various locations in the vehicle system 6, as discussed in more detail herein. As another example, the actuators may include fuel injector 66, valve 28, valve 24, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 8-12.

Hydrocarbon retaining system 22 can operate to store hydrocarbons from a plurality of sources, including the engine exhaust 25 and the fuel system 18, concurrently or during different operating conditions. Under some operating conditions, such as during engine starts when the emission control device is not yet to its light-off temperature (e.g., a temperature at which the device reaches a selected, sufficiently high, conversion efficiency for a particular exhaust constituent), exhaust gas may be routed from the exhaust 25 to the hydrocarbon retaining system 22, and then to the atmosphere through vent 27. In this way, an increase amount of cold start hydrocarbon emissions may be stored in hydrocarbon retaining system 22 while the exhaust gases heat emission control device 70. Then, once device 70 reaches sufficient operating temperature, exhaust gases are then routed to atmosphere through conduit 35 and the hydrocarbon retaining system 22 is substantially isolated from the engine exhaust gas. Additionally, fuel vapors generated in the fuel tank 20 may be routed to hydrocarbon retaining system 22 for storage before being delivered to the engine intake 25 and combusted in the engine 10. These different storing modes (from the exhaust 25, and from fuel system 18) may be carried out concurrently, separately, or combinations thereof.

After being isolated from the exhaust gas, the hydrocarbon retaining system 22 may be coupled to the engine intake to draw fresh air through vent 27 and purge stored hydrocarbons into the engine intake to be combusted in the engine. Such purging operation may occur during selected engine operating conditions as described herein.

Additional details of purging and storing operation are described herein.

Figure 2:
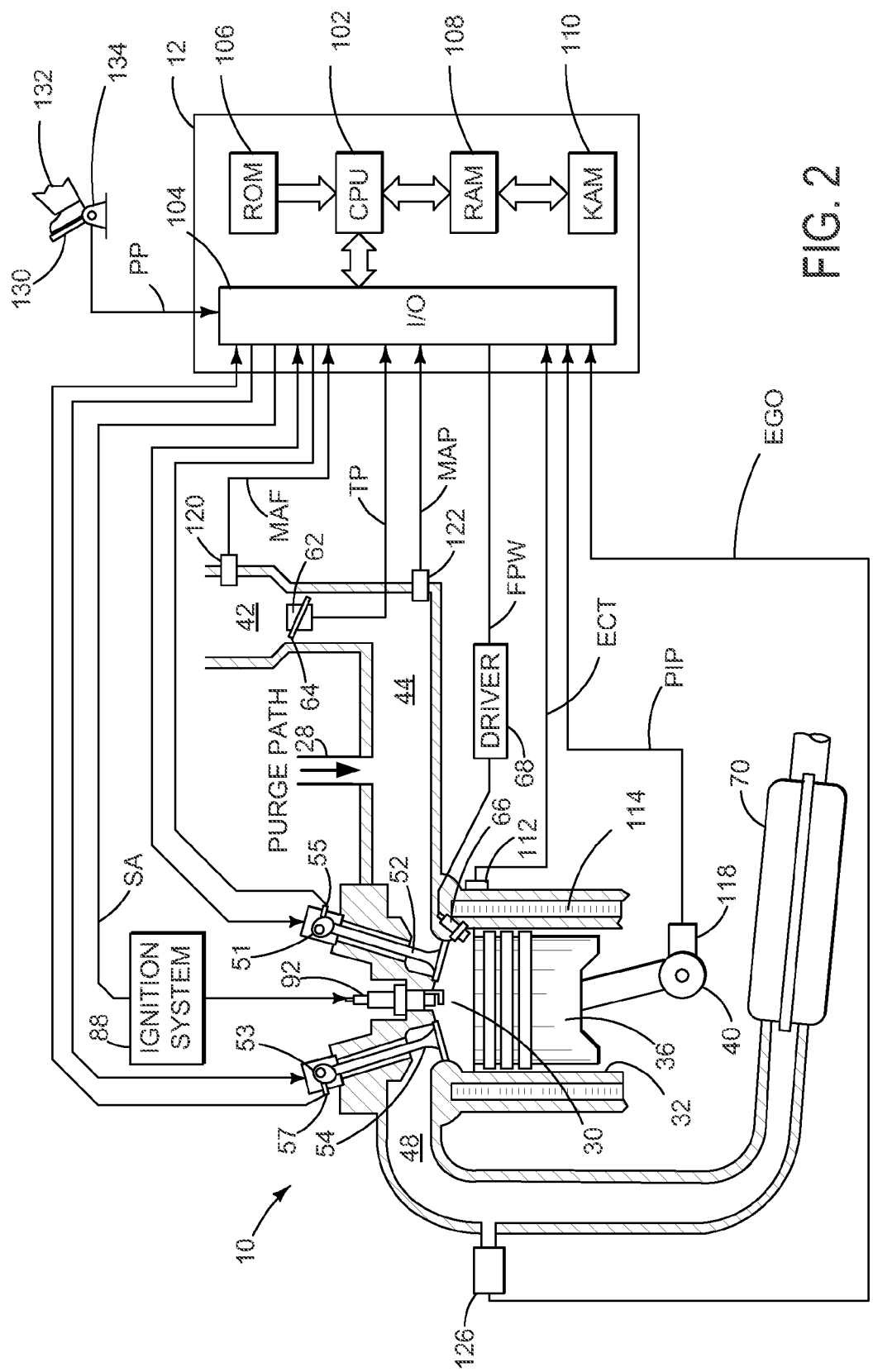
FIG. 2 shows a schematic depiction of an internal combustion engine.

FIG. 2 is a schematic diagram showing one cylinder of multi-cylinder engine 10. As described with regard to FIG. 1, engine 10 may be controlled at least partially by a control system including controller 12, as well as by input from a vehicle operator 132 via an input device 130. In this example, input device 130 includes an accelerator pedal and a pedal position sensor 134 for generating a proportional pedal position signal PP. Combustion chamber, or cylinder, 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves. The intake manifold may include a purge path fluidly coupled to the exhaust stream allowing purge vapors to be delivered to the engine intake manifold 44. While this example shows the purge path downstream of the throttle to enable manifold vacuum to draw in the gases, various other configurations may also be used. For example, in the case of a turbocharged engine, the purge line(s) may lead to upstream of the turbocharger compressor inlet.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three-way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF); engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal (MAP) from sensor 122. Engine speed signal, RPM, may be generated by controller 12 from signal PIP. Manifold pressure signal MAP from a manifold pressure sensor may be used to provide an indication of vacuum, or pressure, in the intake manifold.

As described above, FIG. 2 shows only one cylinder of a multi-cylinder engine 10, and that each cylinder may similarly include its own set of intake/exhaust valves, fuel injector, spark plug, etc.

Figure 3:
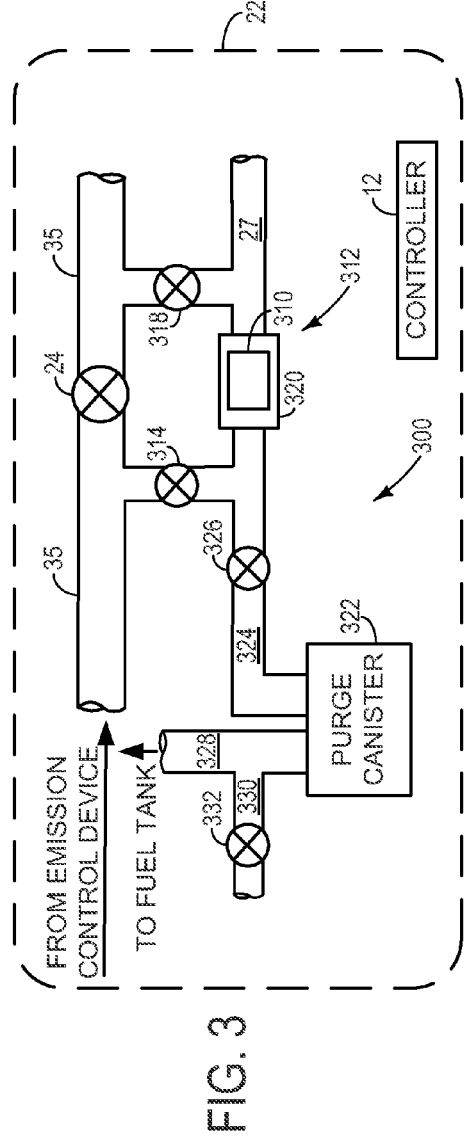
FIGS. 3, 4, 5, 6, and 7 show various embodiments of the HC Retaining System.

FIG. 3 shows a first embodiment 300 of the hydrocarbon retaining system including hydrocarbon retaining devices, such as HC trap 310 arranged in parallel with exhaust conduit 35, downstream of the emission control device 70, and canister 322. An exhaust conduit valve 24 is located in the exhaust conduit for blocking exhaust flow during a first mode, and allowing exhaust flow to pass during a second mode. A bypass conduit 312 is coupled upstream and downstream of the exhaust conduit valve 24. Further, the bypass conduit 312 includes a first bypass valve 314, an HC trap 310, and a second bypass valve 318. In this example the HC trap may include a brick 320. In other examples the HC trap may include a plurality of bricks or other structures, such as activated charcoal. Further, HC trap 310 may also be a canister using micropore (0.5 nm pore size range) activated carbon or zeolites. The bypass conduit 312 leads to the atmosphere through vent 27, and optionally through valve 318 and conduit 35.

Furthermore, the HC trap 310 may be fluidly coupled to a purge canister 322 via passage 324. The purge canister 322 may be configured to collect vapor from the fuel system, such as via a conduit 328 leading to the fuel tank 20. The passage 324 may include a valve 326. The purge canister 322 may also be fluidly coupled to the engine intake via a conduit 330 and valve 332. Similar to the HC trap 310, the canister 322 may include activated charcoal, although it may have a different, e.g., high, porosity.

While this example shows two hydrocarbon retaining devices (e.g., HC trap 310 and purge canister 322), various alternatives may be provided. For example, a single hydrocarbon retaining device, such as a canister, may be used, where the canister operates to store both exhaust hydrocarbons as well as fuel tank vapors. Further, the two hydrocarbon retaining devices may each be canisters, or may each be HC traps. Irrespective of the particular configuration of the HC retaining system, the hydrocarbon retaining devices can receive routed cold start hydrocarbons and retain the hydrocarbons.

In one example, the hydrocarbon retaining devices may comprise granular activated carbon contained in a plastic housing, since the exhaust gas temperatures may be substantially lower than the full range of exhaust temperature experienced in the exhaust system.

The hydrocarbon retaining system 22 of FIG. 3 may be operated by a controller in a plurality of modes by selective adjustment of the various valves. For example, the following operating modes may be performed:

MODE A: Exhaust Hydrocarbon Storage

During select engine and/or vehicle operating conditions, the controller 12 may close valves 24 and 326, and open valves 314 and optionally 318. Additionally, valve 332 is closed. Example operating conditions include cold engine starting operation before the emission control device has reached a light-off temperature. In this mode, exhaust from engine 10 is routed through HC trap 310 before exiting to the atmosphere via vent 27, while the purge canister 322 is isolated from the exhaust gas and hydrocarbon retaining system.

MODE B: Fuel Vapor Storage

During select engine and/or vehicle operating conditions, the controller 12 may open valve 24 and 326, and close valves 314 and 318. Valve 332 may be closed, in which case fuel tank vapors are merely stored, and not purged. Alternatively, valve 332 may be open to a controlled amount, such that some fuel tank vapors are stored and some are delivered to the engine for combustion. In this mode, at least some fuel tank vapors are routed through and retained in both purge canister 322 and HC trap 310 before being vented through vent 27. As such, the fuel tank may be communicated to the hydrocarbon retaining system.

MODE C: HC Trap and/or Canister Purging

During select engine and/or vehicle operating conditions, the controller 12 may open valve 24 and 326, and close valves 314 and 318. Additionally, valve 332 may be open to a controlled amount, such that fresh air is drawn through vent 27 to purge HC trap 310 and purge canister 322 through 330 and valve 332 to the engine intake 25. In this mode, the purged fuel vapors from the canister and/or HC trap are combusted in the engine, while exhaust gas is routed through conduit 35 to the atmosphere after treatment by the emission control device.

In an alternative embodiment, rather than drawing in fresh air via vent 27 to purging stored hydrocarbons, the system may additionally or alternatively route exhaust gases to the vent to enable heated exhaust to heat the hydrocarbon retaining system and better purge stored hydrocarbons. Such operation may be used during specific conditions, such as cold ambient temperatures. Further, under some conditions, the system may intentionally route exhaust gases during the storing mode for a longer duration to heat the hydrocarbon retaining system to a higher temperature, thereby improving the subsequent purging operation. In one example, before a purging operation, exhaust gases may be routed to the hydrocarbon retaining system (even during non-starting conditions) to increase temperature and improve the subsequent purging efficiency. This operation may be used when temperature of the hydrocarbon retaining system falls below a threshold value, or when reduce purging opportunities are present.

Note the configuration of FIG. 3 enables the gas flowing through the HC trap 310 to be routed back to the exhaust 35 and out the tailpipe. Thus, by using the valve 318 (which can be a lower temperature, lower cost valve compared to other exhaust valves in the system) that allows the exhaust flow to return to the exhaust pipe (or be routed to a tailpipe location), various advantages may be achieved. For example, the configuration allows for sufficient flow during the cold start trapping operation without sending exhaust gas to another location other than the tailpipe. Further, by providing a separate port for the purge flow inlet, it is possible to draw purge air from a location that is less susceptible to water ingestion.

Additionally, when the exhaust gas is routed back to the exhaust system as shown in FIG. 3, the HC trap can be positioned upstream of the muffler, thus reducing effects of muffler leakage on the emission system performance.

Figure 4:
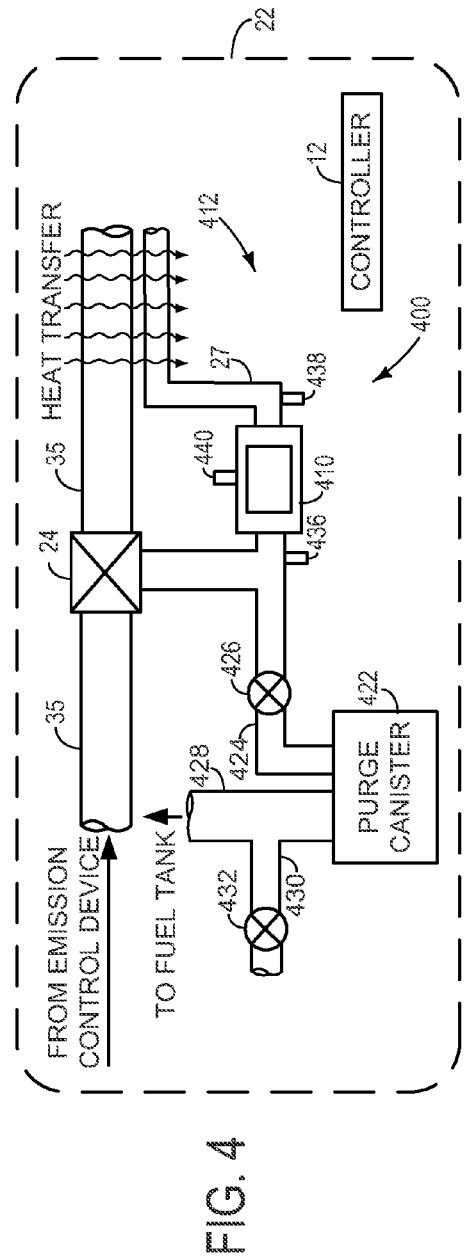

FIG. 4 shows a second embodiment 400 of the hydrocarbon retaining system 22. In this configuration, a valve 24 includes a diverter valve that either routes exhaust gas through conduit 35 to the atmosphere, or to conduit 412. FIG. 4 shows HC trap 410 arranged in parallel with exhaust conduit 35, downstream of the emission control device 70. Conduit 412 is coupled upstream of the valve 24 and includes HC trap 410.

Furthermore, the HC trap 410 may be fluidly coupled to a purge canister 422 via passage 424 and valve 426. The purge canister 422 may be configured to collect vapor from the fuel system, such as via a conduit 428 leading to the fuel tank 20). The purge canister 422 may also be fluidly coupled to the engine intake via a conduit 430 and valve 432. The hydrocarbon retaining system 22 may also include a first pressure sensor 436 and a second pressure sensor 438 coupled to conduit 424. Additionally, an HC trap temperature sensor 440 may be coupled directly to the HC trap.

As shown schematically in FIG. 4, vent 27 is thermally coupled to at least a portion of conduit 35 so that heat is transferred therebetween. In one example, the vent 27 may be spatially adjacent to at least a portion of conduit 35.

The hydrocarbon retaining system of FIG. 4 may be operated by a controller in a plurality of modes by selective adjustment of the various valves. For example, the following operating modes may be performed:

MODE A: Exhaust Hydrocarbon Storage

During select engine and/or vehicle operating conditions, the controller 12 may adjust valve 24 to divert exhaust gas to conduit 412, as well as close valves 432 and 426. Example operating conditions include cold engine starting operation before the emission control device has reached a light-off temperature. In this mode, exhaust from engine 10 is routed through HC trap 410 before exiting to the atmosphere via vent 27, while the purge canister 422 is isolated from the exhaust gas and hydrocarbon retaining system.

MODE B: Fuel Vapor Storage

During select engine and/or vehicle operating conditions, the controller 12 may adjust valve 24 to direct exhaust gas through conduit 35, and isolate the hydrocarbon trap 410 from exhaust gas. Additionally, the control may open valve 326, and close valve 432. In this mode, at least some fuel tank vapors are routed through and retained in both purge canister 422 and HC trap 410 before being vented through vent 27.

MODE C: HC Trap and/or Canister Purging

During select engine and/or vehicle operating conditions, the controller 12 may adjust valve 24 to direct exhaust gas through conduit 35, and isolate the hydrocarbon trap 410 from exhaust gas. Additionally, the control may open valve 326, and controllably open valve 432 such that fresh air is drawn through vent 27 to purge HC trap 410 and purge canister 422 through 430 and valve 432 to the engine intake 25. In this mode, the purged fuel vapors from the canister and/or HC trap are combusted in the engine, while exhaust gas is routed through conduit 35 to the atmosphere after treatment by the emission control device. As noted above, heat may be transferred to the fresh air inducted to vent 27. In some examples heat may be transferred through conduction, convection, forced convection, combinations thereof, or alternative forms of thermal communication. In this way, when the system is warming up to operating temperature, the warmed air may improve release of hydrocarbons stored in HC trap 410 and/or purge canister 422.

Figure 5:
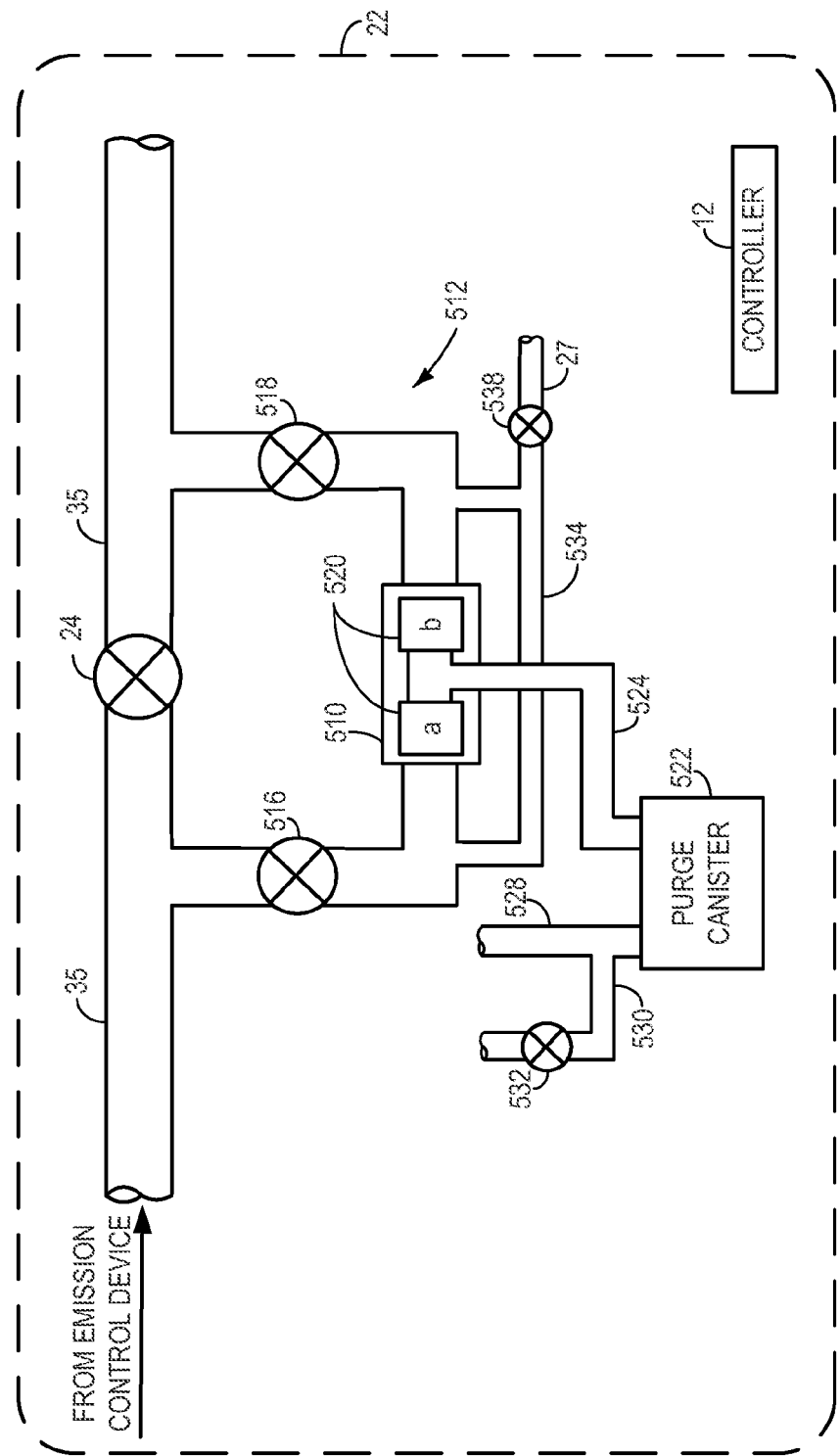

FIG. 5 shows a schematic depiction of a third embodiment of the hydrocarbon retaining system 22. This embodiment is similar to that of FIG. 3, except that the HC trap 510 includes two bricks 520, and is configured to pass exhaust gasses serially through the bricks, but purge them in parallel. Specifically, the system of FIG. 5 includes HC trap 510 arranged in parallel with exhaust conduit 35, downstream of the emission control device 70. An exhaust conduit valve 24, which in this example may be a throttle, is located in the exhaust conduit for blocking exhaust flow during a first mode, and allowing exhaust flow to pass during a second mode. A bypass conduit 512 is coupled upstream and downstream of the exhaust conduit valve 24. Further, the bypass conduit 512 includes a first bypass valve 514, the HC trap 510, and a second bypass valve 518. The bypass conduit 512 is also coupled to vent 27 via two parallel passages 534 and valve 538.

Furthermore, the HC trap 510 is fluidly coupled to a purge canister 522 via passage 524. The purge canister 522 may be configured to collect vapor from the fuel system, such as via a conduit 528 leading to the fuel tank 20 (not shown). The purge canister 522 may also be fluidly coupled to the engine intake via a conduit 530 and valve 532.

The hydrocarbon retaining system of FIG. 5 may be operated by a controller in a plurality of modes by selective adjustment of the various valves. For example, the following operating modes may be performed:

MODE A: Exhaust Hydrocarbon Storage

During select engine and/or vehicle operating conditions, the controller 12 may close valves 24 and 538, and open valves 514 and 518. Additionally, valve 532 is closed. Example operating conditions include cold engine starting operation before the emission control device has reached a light-off temperature. In this mode, exhaust from engine 10 is routed through HC trap 510 (sequentially through bricks 520a and then 520b) before exiting to the atmosphere via conduit 35, while the purge canister 522 is effectively isolated from the exhaust gas as the flow is deadheaded against valve 526.

MODE B: Fuel Vapor Storage

During select engine and/or vehicle operating conditions, the controller 12 may open valve 24, 526, and 538, and close valves 514 and 518. Valve 532 may also be closed. The exhaust gases are thus isolated from the canister 522 and HC trap 510. In this mode, at least some fuel tank vapors are routed through and retained in both purge canister 522 and HC trap 510 before being vented through valve 538 and vent 27. In particular, the fuel vapors are first routed through canister 522 and then routed, in parallel through bricks 520a and 520b, respectively, before being vented through 27. In this way, fuel tank vapors may be stored in different concentrations at different locations of the traps, due to the different direction of flow of exhaust gas and fuel tank vapors, at least from brick 510a.

MODE C: HC Trap and/or Canister Purging

During select engine and/or vehicle operating conditions, the controller 12 may open valve 24 and 538, and close valves 514 and 518. Additionally, valve 532 may be open to a controlled amount, such that fresh air is drawn through vent 27 to purge HC trap 510 and purge canister 522 through 530 and valve 532 to the engine intake 25. In this mode, the purged fuel vapors from the canister and/or HC trap are combusted in the engine, while exhaust gas is routed through conduit 35 to the atmosphere after treatment by the emission control device. Again, in flow movement opposite to that of MODE B of FIG. 5, fresh air is routed in parallel to bricks 520a and 520b, before being combined and routed through purge canister 522. In this way, purging of vapors occurs in a direction opposite to that of fuel tank vapor storing in both bricks, and opposite to the direction of exhaust gas hydrocarbon storing in at least one brick (520a).

Such differential storing and purging directions, making use of both serial storing and parallel purging, can enable improved storage and release, thus increasing efficiency of the engine and emission system.

Figure 6:
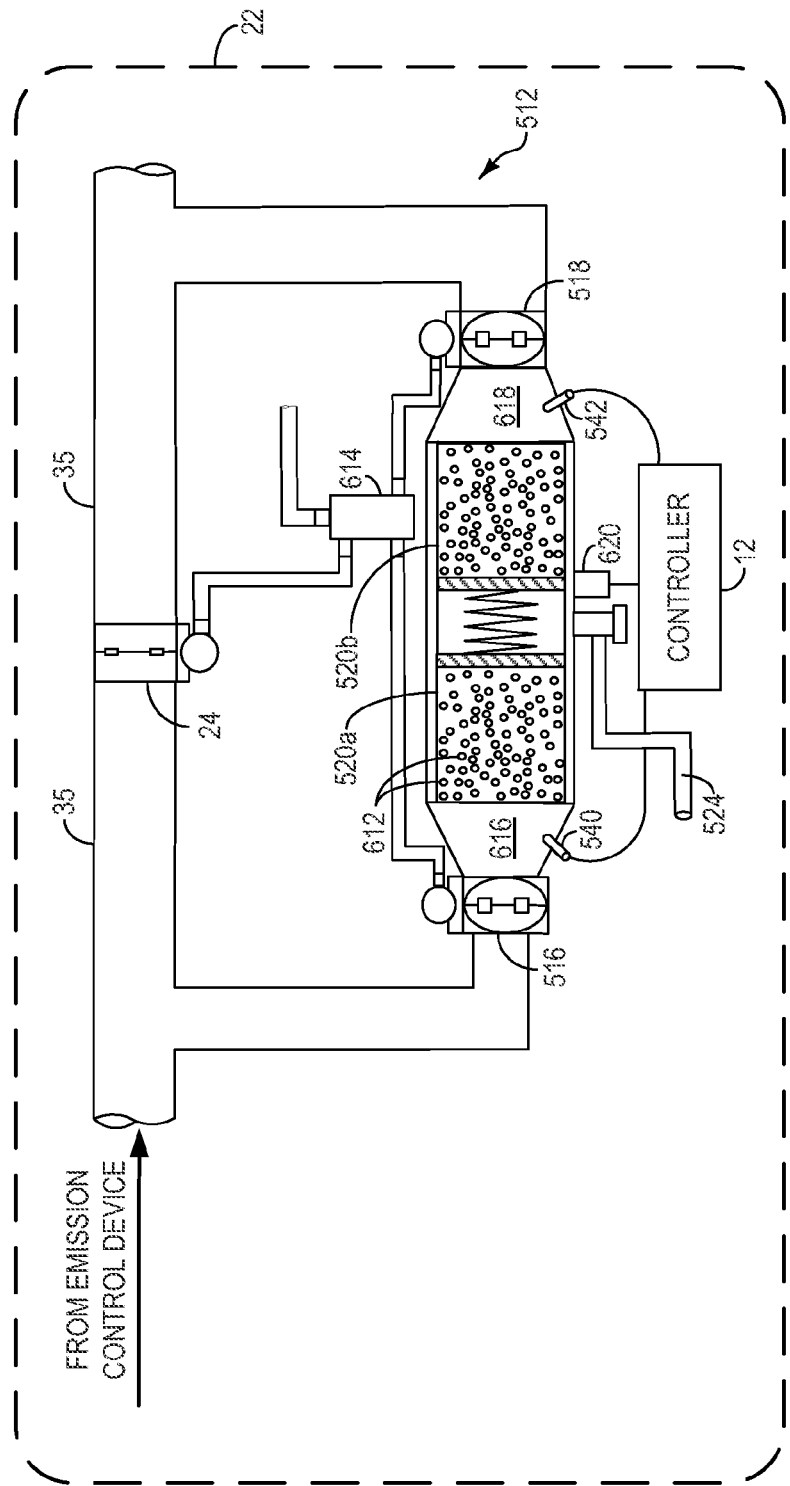

FIG. 6 shows additional details of an example of the third embodiment of FIG. 5. Similar components are labeled accordingly. In this example, valves 24, 518, and 514 are vacuum actuated throttle valves. The HC trap includes two bricks 520a,b having activated carbon pellets 612. A vacuum regulator 614 is coupled to the valves 24, 514, and 518, and may be configured to closed valve 24 whenever valves 518 and 514 are open, and vice versa. The vacuum regulator 614 may be electronically actuated by controller 12 in one example.

Continuing with FIG. 6, a first pressure sensor 540 and a second pressure sensor 542 are coupled to the intake 616 and outlet 618 of the HC trap. On Board Diagnostic (OBD) sensor 620 may be coupled between the first and the second bricks, 520a and 520b, respectively. The OBD sensor may measure the gas pressure, composition, or a combination thereof in the HC trap.

In this example, HC trap 510 may be located after an underbody catalyst can but before a muffler. Further, the length of the conduits from exhaust 35 can be >12 inches to reduce the exhaust gas temperature from 800° C. to 100° C. and to permit plastic components. Further, carbon may further operate to reduce noise when bypassing a muffler in the exhaust.

Continuing with one example, the exhaust flaps at the canister inlet and outlet (616, 618) can be plastic and can be integrated into a plastic housing of the trap/canister. The device may include a rubber gasket/o-ring to help seal around the housing where the flap would close or around the plastic flap due to reduced temperature. The housing of device 510 may comprise 1.5" ID entry/exit tubes, molded bosses in the spring section for a sensor and poppet valve, molded ports on the cones for air intake, screens on both sides of the carbon bed to allow flow through the canister and actuated exhaust flaps. The inlet valve coupled to 524 may be located between the packed beds. At that spot, OBD sensor 620 can observe loading and unloading of the beds. If the plastic exhaust flaps seal, the poppet valve will let in air from the air cleaner box, in one example. The fresh air inlet at each cone is split from the inlet air source downstream of the vent valve. The outlet may lead to the fuel tank vapor purge system, either in series into the canister 522, for example, or in parallel thereto.

Figure 7:
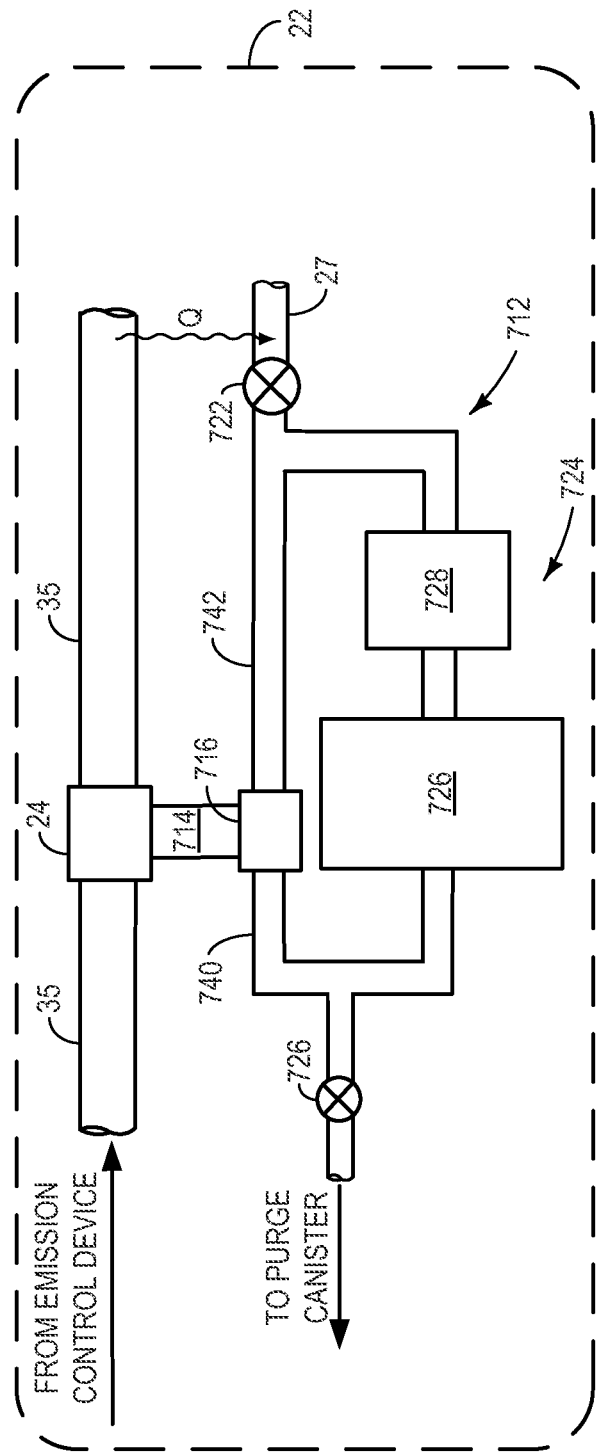

FIG. 7 shows a fourth embodiment of a hydrocarbon retaining system 22. This example is similar to that of FIG. 4, although different valve and conduit configurations are used, along with two HC traps, in bypass 712. Specifically, in this example, valve 24 operates as a diverter valve to either allow exhaust gas flow through conduit 35 to atmosphere, or to direct the exhaust gas flow to conduit 714 and valve 716. In this example, valve 716 is another diverter valve which either allows communication between conduit 714 and conduit 740, or conduit 714 and conduit 742. Bypass 712 further includes a first and second HC trap, 726 and 728, respectively. Further still, a valve 726 is shown for controlling flow leading to, or coming from, the purge canister (not shown), which then leads to the fuel tank and intake manifold, similar to the other example configurations described above. As such, fuel vapors from the fuel tank may be routed to the first and second traps, 726 and 728, in that order, and purged in the opposite order.

In FIG. 7, the two traps 726 and 728 are configured with different HC trapping characteristics. For example, trap 726 may be of a larger porosity activated carbon to capture larger HC molecules as compared to trap 728. In this way, during storage, the gases may be routed first through 726 and then through 728, such that HC molecule size in the gas is progressively reduced. Additionally, since stored HC molecules may be difficult to remove from the smaller pore activated carbon, the smaller pore activated carbon may be buffered by the larger pore size activated carbon to inhibit HC molecules from irreversibly absorbing into the smaller pores. Furthermore, the adsorption of smaller HC species into trap 728 may occur at higher pressures. As such, the inlet piping diameter from the diverter valve 716 to the traps may be sized sufficiently to provide a desired pressure during storage and purge operation.

The configuration of FIG. 7 also provides for opposite flow direction for storage and purging operation, for both traps 726 and 728. Specifically, during storage of HC in the exhaust gas, the diverter valves 24 and 716 route the exhaust gas through 714 and then to trap 726, and then 728, before being vented via 27. During purging of the traps, the valves are adjusted to route fresh air through vent 27, trap 728, and then trap 726, before being delivered through 726 and then to the intake. In this way, improved storage and release of HC can be achieved, especially in light of the differential characteristics (e.g., porosity) of the traps. The configuration of FIG. 7 can thus operate in any of MODES A, B, and C.

While 726 and 728 may each be HC traps in one example, two charcoal canisters may also be used. Alternatively, as noted, zeolites can be included. For example, canister 726 may be configured to adsorb cold-start propylene and higher mass hydrocarbons rather than a separate device. Micro-pore activated carbons in 728 adsorb lower sized hydrocarbons, but can be more protected than 726 in series. Additionally, purging of the traps with preheated air from an air cleaner box or hot vehicle exhaust, in counter-current flow relative to the adsorption flow direction, can further provide improved performance.

While this example shows two traps in the configuration of FIG. 7, more or less may be used.

In one particular example, device 726 can include a carbon canister (of larger porosity) to capture medium to large sized HC molecules, followed by a smaller pore activated carbon canister 728. During storage, gases first pass through 726, and then to 728. Removal is performed in the opposite direction. In this way, the larger pores better protect the smaller pores and reduce irreversible adsorption of larger HC molecules into the smaller pores. The adsorption of small HC species into the small pore medium may better respond to pressure, such as approximately 5 MP, which can be provided by sizing of the inlet piping diameter from the diverter valve to the canisters. Similarly, removal of the HC species may benefit from increased temperature, such as through heat transfer from exhaust gas, or by using at least some exhaust gas, such as during idle conditions.

It should be appreciated that with regard to FIGS. 3-7, MODE A may not only operate to store HC from the exhaust in the hydrocarbon retaining system, but it may also substantially heat the system. This may be advantageously used to thus prepare the hydrocarbon retaining system 22 for subsequent purging operation, as increased temperature can act to more easily release stored hydrocarbons.

Further, while the examples of FIGS. 3-7 show combined purging of the fuel tank vapors and stored exhaust hydrocarbons, in alternative configurations these may be purged independently. For example, the example HC traps may be purged via a purge line in parallel with a purge line of the example canisters, to thereby enable separate and/or independent purging of the different hydrocarbon storage systems. For example, one hydrocarbon retaining device may be purged without purging a second hydrocarbon retaining device. Further still, in some example configurations of FIGS. 3-7, the fuel tank vapors in the purge canisters can be purged sufficiently faster than the hydrocarbons in the HC traps. As such, during initial purging, the learned vapor amount/concentration can be used to determine the amount of fuel vapors stored in the canister, and then, during a later portion of the purging operation (when the canister is sufficiently purged/empty), the learned vapor amount/concentration can be used to estimate a loading state of the HC traps (that was generated during the most recent storing operation, such as the most recent cold start event).

Further still, while the examples of FIGS. 3-7 show non-concurrent storing of exhaust gas hydrocarbons and purging of the retaining system 22, in alternative embodiments, some stored hydrocarbons may be purged during storage of other hydrocarbons.

The following method of FIGS. 8-14 may be implemented using systems, components, and devices described herein, but alternatively may be implemented using other suitable systems, components, and devices.

Figure 8:
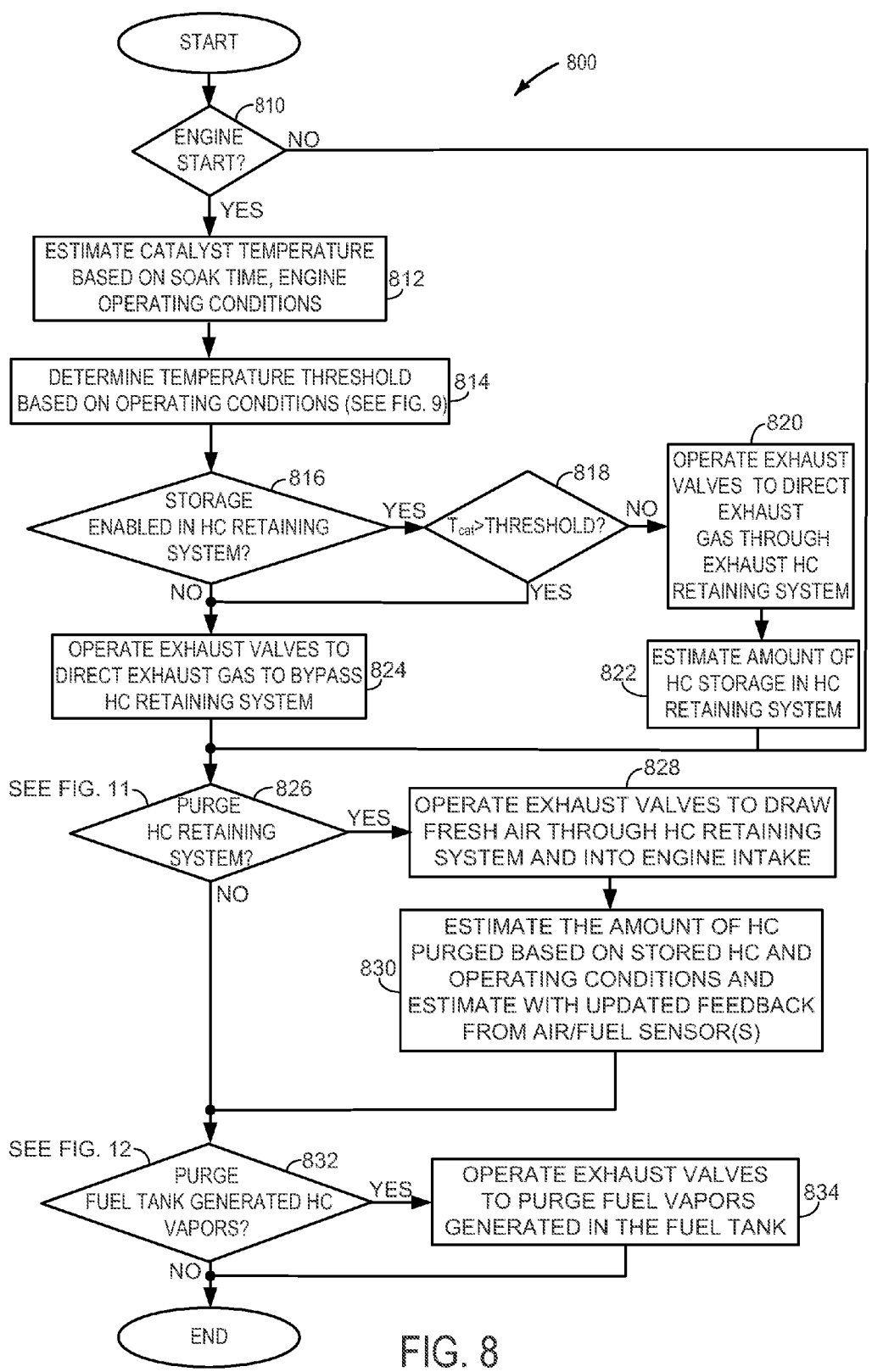
FIGS. 8, 9, 10, 11, 12, 13, and 14 show high level flow charts illustrating operation of the engine, exhaust system, as well as the HC Retaining System.

Referring now to FIG. 8, a routine 800 is shown for controlling engine operation, fuel vapor management, and exhaust emission management. Routine 800 may operate during a warm-up condition, such as while the engine or exhaust warms from ambient temperatures to it normal operating temperature range.

First, at 810, the routine determines whether an engine start is present. For example, the routine may determine whether the engine is being started from rest. Additionally, or alternatively, the routine may determine whether the engine has been started via engine cranking operation. When an engine start is present, the routine continues to 812, where the routine estimates or measures emission control device temperature based on various parameters. In one example, the routine may determine emission control device temperature based on an engine off time (soak time), ambient temperature, engine coolant temperature, and intake air charge temperature. Alternatively, or in addition, the routine may determine emission control device temperature based on one or more exhaust gas temperature sensors located in exhaust passage 35 or exhaust manifold 48. Further still, the routine may determine temperature of an emission control device based on a temperature sensor mounted to the emission control device.

In 814, the routine determines a temperature threshold value based on operating conditions. One example approach for determining the temperature threshold is described herein with regard to FIG. 9. Alternatively, a fixed temperature threshold may be used. In one example, the temperature threshold correlates to a catalyst light-off temperature. Next, the routine continues to 816 to determine whether storage of exhaust generated hydrocarbons in the retaining system 22 is enabled, and if not, to end such routing. Such operation may be adjusted based on various conditions, including whether a capacity of hydrocarbon storage of the retaining system 22 is greater than a threshold value. For example, the routine may enable storage in the retaining system 22 when the storage system 22 has been purged during previous engine operation. Additionally, the routine may enable storage of hydrocarbons in retaining system 22 when temperature of retaining system 22 is less than a maximum storage temperature. Further, the routine may enable storage of exhaust hydrocarbons in retaining system 22 as based on a fuel property of the fuel combusted in the engine, such as an alcohol amount in the fuel, where the alcohol amount in the fuel may be learned during previous engine operation. In this way, the ending of the routing of exhaust gas to the hydrocarbon retaining system 22 may be adjusted to take advantage of the different storage characteristics of different fuels. For example routing may continue up to higher storage amounts, or for a longer duration, when combusting higher alcohol content fuels as compared to lower alcohol content fuels. Further still, the routine may enable storage of hydrocarbons in retaining system 22 when an engine soak time (e.g., an engine/vehicle off-duration) is greater than a threshold amount. In this way, during hot re-starts, for example, the engine start may direct exhaust gases through exhaust system 35 and bypass the retaining system 22.

When the answer to 816 is yes, the routine continues to 818 to determine whether temperature of emission control device 70 is less than the threshold temperature determined in 814. If so, the routine continues to 820 to operate one or more of the exhaust valves (e.g., 24) to direct exhaust gas through the hydrocarbon retaining system 22, and in particular through one or more hydrocarbon traps. For example, depending on the system configuration, control system 14 may adjust one or more exhaust valves to route exhaust gas from downstream of emission control device 70 to and through the hydrocarbon retaining system 22 before being vented or routed to the atmosphere. In one example, the routine operates the system in MODE A, described above herein. Further, the system may operate with spark timing substantially at a peak torque timing, or may operate with an amount of spark retard, depending on operating conditions as described herein with regard to FIG. 10, for example.

Next, in 822, the routine estimates an amount of hydrocarbon stored in the hydrocarbon retaining system 22, such as the amount of hydrocarbon stored in HC trap 310. The routine may estimate the amount of stored hydrocarbons based on exhaust gas flow rate, exhaust temperature, temperature of hydrocarbon retaining system 22, engine speed, and various other parameters.

When the answer to either 816 is no or 818 is yes, the routine continues to 824 to operate the exhaust valves to direct exhaust gas from the emission control device 70 to bypass the hydrocarbon retaining system 22 and be delivered to the atmosphere through conduit 35. Also, as noted herein, the exhaust gas may be routed through various additional emission control devices and/or mufflers before being delivered to the atmosphere. In one example during the operation of 824, the routine operates the engine to increase exhaust gas temperature thus retarding ignition timing sufficiently past MBT timing as well as performing combustion at a slightly lean air-fuel ratio in the combustion chamber. Further, the operation of 824 may thus result in the system not operating in MODE A, although the system may or may not operate in MODES B and C, as described further herein with regard to FIG. 8.

Figure 11:
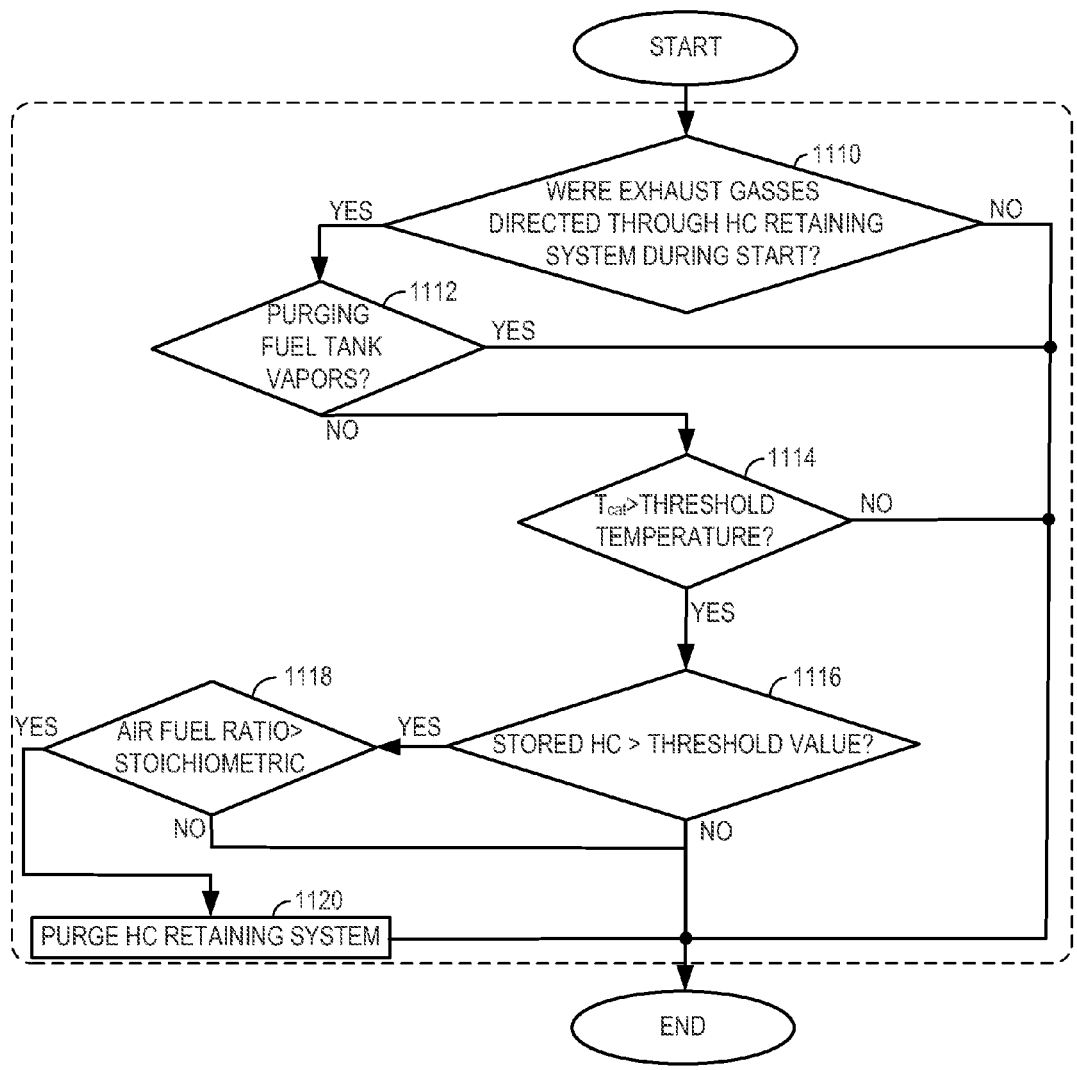

From 824 or 822, the routine continues to 826 to determine whether purging of stored hydrocarbons from the hydrocarbon retaining system 22 should be carried out (for example, whether the system can operate in MODE C). In one example, the routine of FIG. 11 shows one example of determining whether to purge the hydrocarbon retaining system 22. Initiating the purging of the hydrocarbon retaining system 22 may be based on various engine and vehicle operating parameters, including the amount of hydrocarbon stored in the retaining system 22 (such as the amount of hydrocarbons stored in HC trap 310), the temperature of the emission control device 70, temperature of the hydrocarbon retaining system, fuel temperature, the number of starts since the last purge, fuel properties (such as the alcohol amount in the combusted fuel), and various others. In one example at 826, the routine determines whether exhaust gases were routed to the hydrocarbon retaining system 22 during the current engine start. In one particular example, the initiating of the purging may be adjusted to be initiated at higher temperatures as the alcohol amount in the fuel increases.

When the answer to 826 is yes, the routine continues to 828 to operate the exhaust valves to draw fresh air through hydrocarbon retaining system 22 and into intake passage 42 of engine 10, which may include operating the system in MODE C. Engine 10 then operates to induct the vapors along with injected fuel and intake air, and perform combustion thereof. Next, in 830, the routine estimates the amount of purged hydrocarbons from the hydrocarbon retaining system 22 (which may be attributed to one or both of an HC trap and purge canister) based on various parameters including the amount of stored hydrocarbons, as well as feedback information from exhaust air-fuel ratio sensors. In one example, feedback from an exhaust gas oxygen sensor may be used to learn or update the estimated amount of hydrocarbons stored in the HC trap to determine degradation of the HC trap based on such an estimate. Further, the routine may also adjust throttling of the engine to adjust an amount of purge gases drawn through a purge canister, HC trap, or both.

When the answer to 826 is no, or from 830, the routine continues to 832. At 832, the routine determines whether to purge hydrocarbon vapors generated from the fuel tank, in the event that such vapors were not purged at 828, or were not sufficiently purged at 828. One example routine for determining whether to purge fuel tank generated vapors is described herein with regard to FIG. 12. When the answer to 832 is yes, the routine continues to 834 to operate the exhaust valves to purge fuel tank generated vapors from the hydrocarbon retaining system 22, which may include operating the system in MODE C. Otherwise when the answer to 832 is no, or from 834, the routine continues to the end.

While not illustrated specifically in FIG. 8, the control system may also operate the system in MODE B whenever the system is not operating in MODE A or C. Alternatively, MODE B may be selectively enabled based on various operating conditions, including ambient temperature, fuel temperature, and others.

Additionally, by appropriate temperature considerations, it is possible to further provide control of routing of exhaust gas to the hydrocarbon retaining system, and purging of the hydrocarbon retaining system to the engine intake, to account for warm engine restart conditions. For example, the system may consider engine coolant temperature and catalyst temperature in the enabling of the routine and initiation of the purging such that if coolant temperature is above a warm re-start threshold and/or catalyst temperature is above a warm re-start threshold, the routing of exhaust gas to the hydrocarbon retaining system is disabled and purging is initiated once engine crank/run-up is completed.

Figure 9:
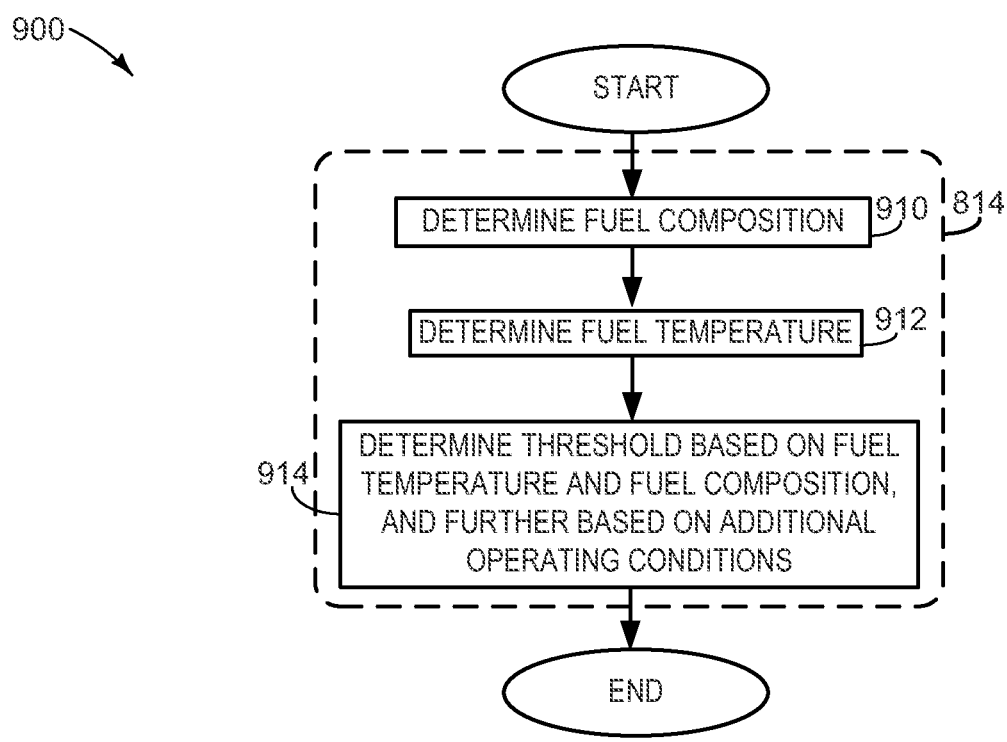

Referring now to FIG. 9, routine 900 is described for determining a temperature threshold below which exhaust gases may be routed to hydrocarbon retaining system 22. First, at 910, the routine determines a fuel composition. In one example, the routine may determine an alcohol concentration and/or fuel blend of the fuel stored in tank 20. The alcohol concentration may be learned based on feedback from exhaust gas oxygen sensors indicating a shift in the stoichiometric air-fuel ratio. Additionally, or alternatively, the routine may determine an alcohol concentration of the fuel based on a fuel concentration sensor. Note that the routine may determine a relative alcohol amount in a gasoline fuel, or various other fuel compositions.

Next, at 912, the routine determines a fuel temperature. In one example, the routine may measure fuel temperature from a fuel temperature sensor coupled to fuel tank 20. Alternatively, the routine may estimate fuel temperature based on various parameters, including engine coolant temperature, ambient air temperature, and/or various others.

Next, at 914, the routine determines a temperature threshold based on the fuel temperature and composition/makeup of 912 and 910, respectively. Additionally, the routine may determine the threshold based on additional operating conditions, including aging of catalytic material of the emission control device 70. In one example, the routine may increase the temperature threshold as the amount of alcohol in the fuel blend increases. In this way, it is possible to adjust the temperature range at which exhaust gas is routed to a hydrocarbon trap in the hydrocarbon retaining system 22. Specifically, such operation can take advantage of the different storage properties of the trap as the amount of alcohol in the fuel varies. For example, fuels may have different adsorption and/or desorption characteristics with varying alcohol content. Also, water in the exhaust may affect temperature at which storage/release of hydrocarbon species occurs. As the alcohol content of the fuel varies, different HC chains may be produced in the exhaust, thus generating the different storage/release characteristics. In one particular example, HCs may be trapped up to higher temperatures with increase alcohol content in the fuel, and therefore the termination or reduction of operation in MODE A may be delayed to higher temperature with increase alcohol content in the fuel.

Figure 10:
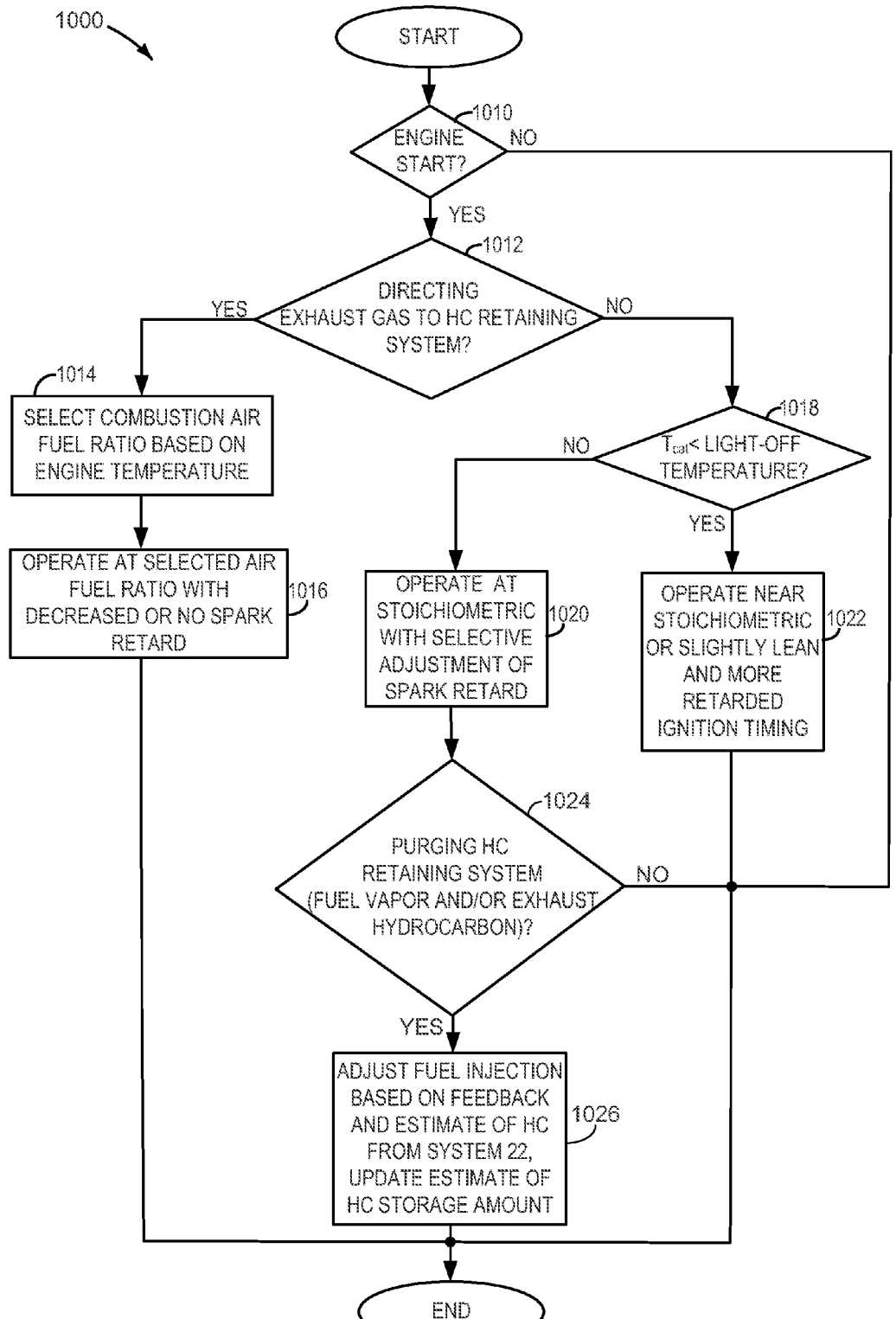

Referring now to FIG. 10, it shows an example routine 1000 for controlling combustion air-fuel ratio during engine starting based on the mode of exhaust gas routing, and/or hydrocarbon retaining system purging.

First, at 1010, the routine determines whether the engine is starting, such as described with regard to 810. If so, the routine continues to 1012 to determine whether the system is directing gas to hydrocarbon retaining system 22 (e.g., whether MODE A operation is present). If so, the routing continues to 1014 to select combustion air-fuel ratio based on engine coolant temperature, as well as various other parameters. Next, at 1016, the routine operates at the selected air to fuel ratio with decreased or no spark retard, such as by operating at MBT timing, potentially even during conditions where temperature of the emission control device (e.g., catalytic converter in the exhaust) is substantially below its light-off temperature. In one example, the air-fuel ratio selected at 1014 may initially, during the start, be slightly lean, and after cranking and run up of engine speed, the selected air-fuel ratio may be approximately stoichiometry, or slightly rich. Alternatively, the air-fuel ratio may be selected based on the amount of hydrocarbons stored in hydrocarbon retaining system 22 (such as the amount of hydrocarbons stored in HC trap 310). For example, as the amount of hydrocarbon stored in the hydrocarbon retaining system 22 increases, the combustion air-fuel ratio may be correspondingly adjusted higher, (e.g., less rich, or more lean).

When the answer to 1012 is no, the routine continues to 1018 to determine whether temperature of the emission control device 70 is less than a light off temperature. When the answer to 1018 is no, the routine continues to operate the engine to combust approximately stoichiometric air-fuel ratio with selective adjustment of spark retard (e.g., substantially no spark retard, unless needed for knock abatement, torque reduction, etc.). Alternatively, when the answer to 1018 is yes, the routine continues to 1022 to operate the engine to combust a near stoichiometric or slightly lean air-fuel ratio with ignition timing retarded more than operation at 1016 and/or 1020. Otherwise, at 1020, the routine operates the engine to combust a stoichiometric air-fuel ratio with selective adjustment of spark retard, with less retard than at 1022. For example, the ignition timing may be retarded an amount based on catalyst temperature.

As still another example, the system may thus operate in a plurality of ignition timing retard modes based on whether exhaust gasses are routed to the hydrocarbon retaining device. For example, the modes may include a first mode where the routine routes exhaust gases to the hydrocarbon retaining system and operates during at least a portion of first mode with spark at a first timing, and with a first engine/exhaust air-fuel ratio; and a second mode where the routine bypasses the hydrocarbon retaining system and operates during at least a portion of the second mode with spark at a second timing more retarded than first timing or a second engine/exhaust air-fuel ratio leaner than the first exhaust air-fuel ratio. In one particular example, the second mode is performed after the first mode, both during a common engine start, and where the first mode is performed at a lower temperature of the emission control device than the second mode. Further, the first air-fuel ratio may be lean during a first portion, and stoichiometric or rich during a second portion of the first mode. Alternatively, the first mode may be performed during a first engine start, and the second mode may be performed during a second engine start, where during the second start, the hydrocarbon retaining system may have a greater amount of hydrocarbons stored than during the first start.

Next, at 1024, from 1020, the routine determines whether purging of the retaining system 22 is present, including purging of one or both of stored fuel tank vapors and stored exhaust gas hydrocarbons. If so, the routine continues to 1026 where the control system adjusts the fuel injection amount responsive to feedback from one or more exhaust gas oxygen sensors to maintain stoichiometric combustion and learning an amount of hydrocarbons being purged from and/or an amount of hydrocarbons stored in, retaining system 22. Additionally, the routine may adjust the throttle position responsive to an amount of fresh air drawing through the hydrocarbon retaining system. For example, the routine may close the throttle when initiating the purging operation to compensate for additional flow.

In one example, the engine may provide a desired air-fuel ratio by operating some cylinders leaner than the desired air-fuel ratio (e.g., stoichiometric), and some cylinders richer than the desired air-fuel ratio. Such operation may be advantageous in that it can generate additional exothermic exhaust heat, while still providing a stoichiometric exhaust air-fuel ratio. In one example, such split air-fuel ratio operation may be provided during 1016, for example, to enable increased heating of the emission control device. Further, by utilizing an HC trap in the retaining system 22, for example, any remaining hydrocarbons exiting the device 70 can be trapped to maintain desired emission levels.

Referring now to FIG. 11, a routine is described for determining whether to purge the exhaust generated hydrocarbons from retaining system 22. In one example, the routine of FIG. 11 determines whether to end fuel tank vapor storage (e.g., MODE B) and transition to purging (e.g., MODE C).

First, in 1110, the routine determines whether a HC retaining device, such as an HC trap or canister, of system 22, was operated to store hydrocarbons during the engine start. If so, the routine continues to 1112 to determine whether the system is purging fuel tank vapors. If not, the routine continues to 1114 to determine whether an exhaust temperature, such as the temperature of the emission control device, is greater than a threshold temperature, such as the threshold of 818. For example, the threshold may be adjusted based on the alcohol content of fuel in the fuel tank and injected into the engine.

If the answer to 1114 is yes, the routine continues to 1116 to determine whether the amount of stored hydrocarbons in the retaining system 22 (for example the amount of hydrocarbons stored in HC trap 310) is greater than a threshold value. If so, the routine continues to 118 to determine whether the air-fuel ratio of combustion in engine 10 is approximately the stoichiometric ratio. If so, the routine continue to 1120 to purge the retaining system, such as to purge an HC trap and/or canister (e.g., operate in MODE C).

In one example, the operation of FIG. 11 may be carried out after engine starting, or during starting conditions, such as during hot re-start conditions.

Figure 12:
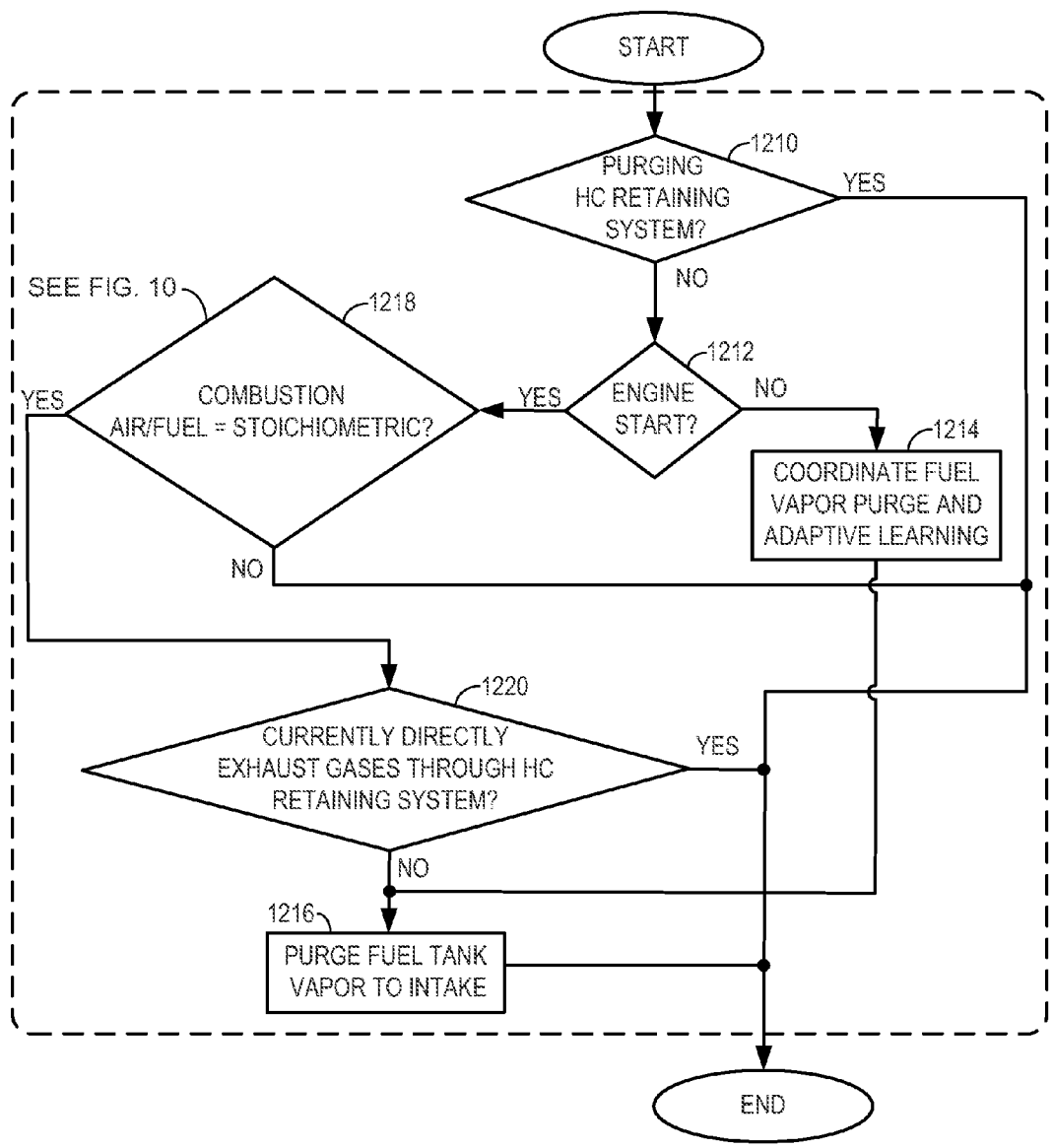

Referring now to FIG. 12, a routine is described for determining whether to purge the fuel tank generated hydrocarbons from retaining system 22. In one example, the routine of FIG. 12 determines whether to end fuel tank vapor storage (e.g., MODE B) and transition to purging (e.g., MODE C). In one example, the routines of FIGS. 11 and 12 may be coordinated together, such as where fuel tank vapor purging and exhaust gas generated hydrocarbon purging occur concurrently. In another example, the routines of FIGS. 11 and 12 are carried out independently, such as where fuel tank vapor purging and exhaust gas generated hydrocarbon purging occur independently.

First, in 1210, the routine determines whether an HC retaining device, such as an HC trap or canister, of system 22, is being purged. If so, the routine ends. Otherwise, the routine continues to 1212 to determine whether an engine start is present, such as described herein. If not, the routine continues to 1214 to coordinate fuel vapor purging with adaptive learning of fuel injector errors, MAF sensor errors, etc., and then the routine continues to 1216 to carry out purging of fuel tank vapors to the intake, as coordinated in 1214.

When the answer to 1212 is yes, the routine continues to 1218 to determine whether the combustion air-fuel ratio is approximately the stoichiometric air-fuel ratio (see FIG. 10). If not, the routine does not enable purge, such as when HEGO sensors are used, since it may be difficult to control air-fuel ratio in the presence of purging operation. If so, the routine continues to 1220 to determine whether the system is currently operating to direct exhaust gases through the retaining system 22. If so, the routine ends (in the case where purging and storage occur non-concurrently). Otherwise, the routine continues to 1216 to purge the retaining system to the intake.

Figure 13:
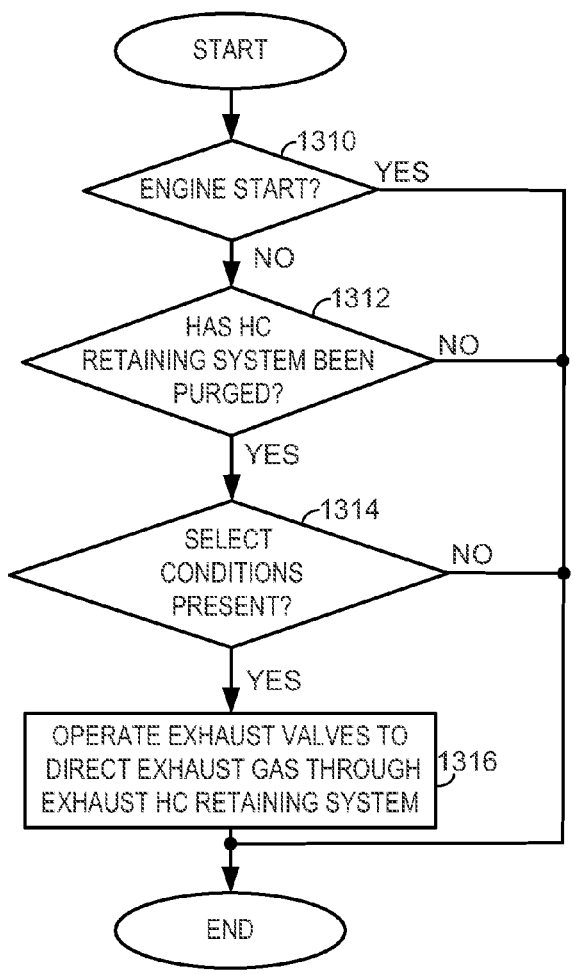

Referring now to FIG. 13, a routine is described for determining whether to route exhaust gases to the hydrocarbon retaining system 22 during conditions other than engine starting operation, such as other engine operating conditions where the engine conditions to spin and/or the vehicle is traveling. The routine of FIG. 13 may be used after engine starting/warm-up operations, such as those described above herein.

For example, the operation described with regard to FIG. 13 may be advantageous during cylinder valve deactivation conditions of one or more cylinders (e.g., variable displacement engine (VDE) operation) where temperature of an emission control device may drop below an activation or light-off temperature. Under such conditions, the remaining active cylinders may operate stoichiometric or slightly rich, and the exhaust gas routed to retaining system 22 for storage of excess hydrocarbons exiting the cooled emission control device. Further, it may be advantageous during deceleration fuel shut-off (DFSO) operation or after reactivation of DFSO cylinders, where a significant amount of fresh, oxygen rich gas is stored in the emission control device, thereby reducing its catalytic reaction of emissions from the engine, as well as its temperature. This can be especially advantageous when reactivating combustion after DFSO, where combustion air-fuel ratio during reactivation is substantially rich to reduce the stored oxygen and re-establish the catalyst's desired oxygen storage state. The operation of FIG. 13 may also be used during catalyst over-temperature conditions (such as when catalyst temperature is above its maximum allowed temperature for the current conditions) where the engine is operated rich to reduce the catalyst temperature.

In still another example, the routine of exhaust gases to the hydrocarbon retaining system 22 during conditions other than engine starting operation may be used to heat the hydrocarbon retaining system 22 for subsequent purging. For example, once the hydrocarbon retaining system 22 is sufficiently heated, purging operation may be enabled. This can be advantageous when the hydrocarbon retaining system 22 is below a threshold temperature, and would otherwise result in slow and/or inefficient hydrocarbon release and/or desorption.

Referring now specifically to FIG. 13, at 1310 the routine determines at 1310 whether an engine start is present, such as described herein. If so, the routine continues to 1312 to determine whether the hydrocarbon retaining system 22 has been purged since the engine start of the present engine operation and/or whether the amount of hydrocarbons and fuel vapors estimated to be stored in the system 22 is less than a threshold value. For example, the routine may determine whether the amount of hydrocarbons stored in the HC trap 310 is less than a threshold value.

If so, the routine continues to 1314 to determine whether select conditions are present. In one example, the select conditions include when an increased potential for hydrocarbon breakthrough from emission control device 70 is greater than a threshold. In another example, the select conditions include deceleration fuel shut-off of one or more cylinders, and/or reactivation from such conditions. In still another example, the select conditions include when the exhaust air-fuel ratio from the engine is sufficiently rich of stoichiometry (e.g., richer than a threshold). In yet another example, the select conditions include when one or more cylinders is deactivated, such as when intake and exhaust valves are held closed throughout the cycle 4-stroke cycle. If so, the routine continues to 1316 to operate the exhaust valves to route exhaust gas through the hydrocarbon retaining system 22 (e.g., operate in MODE A).

In this way, improved emission may be achieved, even during non-engine starting conditions. Further, it will be appreciated that additional purging, after the storing operation of 1316, may be carried out during subsequent engine operation once the operation at 1316 is ended.

Figure 14:
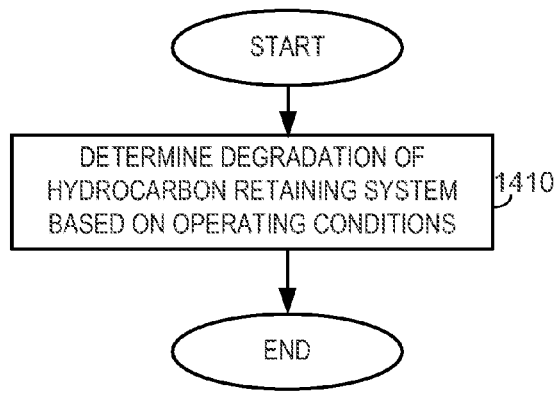

In one particular example, during conditions other than an engine start, where the catalytic emission control device is above its light-off temperature, the routine may route exhaust gas to the hydrocarbon retaining system when temperature of the hydrocarbon retaining system is below a threshold value, the routing continuing until the hydrocarbon retaining system reaches a threshold purging temperature, and then route exhaust gases to atmosphere, bypassing the hydrocarbon retaining system, and purge the hydrocarbon retaining system to the engine intake As noted in FIG. 14, the control system may enable determination of degradation of the retaining system 22, such as to determine and differentiate degradation between a purge canister and an HC trap. In some examples, the purge hydrocarbon concentration learned from exhaust gas oxygen sensor feedback and fuel injection adjustment may provide independent estimates of the hydrocarbon storage, such as when a fuel tank canister (e.g., 422) is at a different temperature than an HC trap (e.g., 310). Alternatively, the learned hydrocarbon amount during purging may be used to determine performance of an HC trap that was loaded and then purged during condition with little to no fuel tank vapor generation, and before which the fuel tank vapors were sufficiently purged. In another particular example, the HC trap may be diagnosed based on detecting change in a temperature condition of gas during purging of gases through the trap. Various examples, as well as additional diagnostic approaches, are described below herein.

In the following examples, the diagnostics are described with respect to the example of a carbon based hydrocarbon trap coupled in retaining system 22. Further, the operation is described in the example where, following a start up event, the exhaust flow is diverted through the HC trap until the emission control device is sufficiently heated and reached a desired conversion efficiency. Further, following the storage, the trapped hydrocarbons are then purged by flowing air through the HC trap back into the engine for combustion. The purge flow may be in series or in parallel with the fuel tank generated evaporative emissions carbon canister purge. However, the following diagnostics may also be applied to various other system configurations and operating modes.

The following diagnostics may be applied as either or both of a functional or threshold monitor. The functional monitor may determine if a device is connected and functioning as expected while a threshold monitor may determine the effectiveness of the emission control device.

One potential degradation mode may include vibration and mechanical damage to carbon in the HC trap—e.g., carbon granules can be fractured and worn down. As such, the HC trapping capability of the trap may be reduced if the carbon granules are broken down and potentially lost out the tailpipe. If enough carbon is lost or compacted and the volume of the trap is no longer filled, some of the exhaust gas may bypass the carbon bed and the tailpipe emissions can increase. Thus, one approach uses a monitor that detects a loss of carbon volume as a threshold monitor.

In a first approach, the control system may measure temperature at the outlet of the HC trap during trapping and purging. Following a cold start, it is expected that the temperature at the outlet will increase as the exhaust system warms up. This indicates that the system is connected to the exhaust system and the valves used to divert the flow to the trap are functioning. After the flow is allowed to bypass the trap, the temperature should stabilize, indicating that the valves have cycled properly. A continued increase in the temperature would indicate that the trap is still being exposed to exhaust gas. During the purge cycle, the temperature should drop as fresh air is inducted into the trap.

In a second approach, pressure differential across the carbon bed of the HC trap may be measured during the trapping or purging as an indication of the presence of a flow restriction due to the carbon. A loss of carbon would lead to a reduction in the pressure difference, for a given flow rate. One or more pressure sensors may be mounted upstream and or downstream of the HC trap.

In a third approach, a fuel vapor/hydrocarbon sensor may be used. For example, an HC sensor in the trap outlet may directly measure the effectiveness of the trap during trapping since any degradation in the trap would result in an increase in the HC breakthrough at vent 27. Some modeling of the concentration and composition of the exhaust gas as a function of speed/load/spark retard/temperatures and/or total fuel consumed since start along with the expected reduction in pre-trap HC due to catalyst light off may be used to improve the capability of a threshold monitor. Alternately, an empirical model of the expected HC out of the trap could be used.

In a fourth approach, temperature sensors placed before and after the HC trap can provide an indication of a temperature difference during the trapping (e.g., due to adsorption) and purging (e.g., desorption) phases. The temperature difference may also be affected by the percentage of the flow that is adsorbed or desorbed on the carbon bed (primarily water and HC). In other examples, temperature deviations from expected or estimated values may be used. In the examples using an HC trap in the exhaust system with a temperature sensor located downstream, the system may utilize an inferred exhaust temperature at the trap outlet to generate a temperature difference between the inferred and actual temperature at the trap outlet. The system can then diagnose adsorption function based on this temperature difference. Further, due to potential errors in temperature estimates, identification of a temperature shift may be based on the initial temperature detected by the temperature sensor, and then considering a measured temperature rise in comparison to an estimated temperature rise during select conditions, such as storing or purging. Note also that in some examples, exhaust gas air-fuel ratio sensors may be operated as a temperature sensor under select conditions.

In a fifth approach, a position measurement of the HC trap can be used. Specifically, to reduce vibration from damaging the carbon in the trap and/or canister, the devices may include a floating end plate and one or more springs to maintain some level of pressure on the carbon. If the carbon deteriorates in spite of these measures, the reduction in volume can lead to a change in the position of the end plate(s) and a reduction in the force applied by the spring. Various methods to detect the movement may be used to identify the loss of carbon. In one example, these may include a position sensor, a thin wire that would break when the spring is extended, contacts that would open if the plate moves, transducers to measure the spring force, or strain gauge like devices built into the spring.

In a sixth approach, probes that measure the conductivity of the carbon bed may be used to provide an impedance measurement that would increase with the loss of spring pressure or a reduction in the carbon volume. The resistance between two contact surfaces applied to the top of the canister may show a larger increase if the bed settled enough to provide a bypass path for the exhaust gasses. In one example, the conductivity may be measured during select conditions, such as during warm-up, or after warm-up.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for managing emissions of an engine of a vehicle, the system comprising:
   a first exhaust passage including an emission control device, the first passage including a downstream section, the downstream section downstream of the emission control device and including a tailpipe of the vehicle;
   a second exhaust passage coupled to the first exhaust passage downstream of the emission control device, the second exhaust passage including a hydrocarbon retaining system, the hydrocarbon retaining system including an atmospheric vent passage separate from an exit of the tailpipe and communicating with ambient, where at least a portion of the atmospheric vent passage is positioned adjacent and thermally coupled to at least a portion of the downstream section of the first exhaust passage; and a control system configured to route exhaust gases to the second exhaust passage during a first condition to stored exhaust hydrocarbon in the hydrocarbon retaining system, and during a second condition, purging the hydrocarbon retaining system to an engine intake the system further configured to switch from the first condition to the second condition based on temperature, where the temperature varies based on fuel alcohol content such that the temperature increases with increasing fuel alcohol content.

2. The system of claim 1 further comprising a purging passage coupled between the engine intake and the hydrocarbon retaining system.

3. The system of claim 1 wherein the control system, during purging, operates the hydrocarbon retaining system to draw fresh air into the atmospheric vent passage to purge hydrocarbons from the hydrocarbon retaining system to the engine intake.

4. The system of claim 1 further comprising a plurality of valves to selectively route exhaust gas to the first and second passages.

5. The system of claim 1 further comprising a muffler in the first passage.

6. An exhaust hydrocarbon-storing method, comprising:
for a duration that increases with higher alcohol fuels, routing combusted exhaust to a hydrocarbon-storing system and then to ambient via a vent separate from a tailpipe exit; and
routing exhaust to ambient via the tailpipe and bypassing the vent and hydrocarbon-storing system, and purging the hydrocarbon-storing system with fresh ambient air entering the vent while transferring tailpipe exhaust heat to the fresh ambient air, without mixing therebetween.

7. The method of claim 6, wherein during purging, the fresh air bypasses a catalytic device coupled in the exhaust, and wherein the vent vents to atmosphere at a location spaced away from the tailpipe exit.

8. The method of claim 6 wherein the purging with fresh ambient air includes delivering purge vapors from the hydrocarbon-storing system to an engine intake, and where fresh ambient air enters the vent from ambient separately from the engine intake.

9. The method of claim 6 wherein initiation of the purging is based on alcohol fuel content, with the purging initiated at higher temperatures for higher alcohol fuels.

* * * * *